(12) United States Patent
Sun et al.

(10) Patent No.: US 10,757,393 B2
(45) Date of Patent: Aug. 25, 2020

(54) METHOD AND APPARATUS FOR MEASURING CHARACTERISTICS OF A SURFACE TOPOLOGY

(71) Applicant: American Advanced Technology, LLC, Potomac, MD (US)

(72) Inventors: Lu Sun, Rockville, MD (US); Yuanyuan Wang, Chongqing (CN)

(73) Assignee: AMERICAN ADVANCED TECHNOLOGY, LLC, Potomac, MD (US)

( * ) Notice: Subject to any disclaimer, the term of this patent is extended or adjusted under 35 U.S.C. 154(b) by 140 days.

(21) Appl. No.: 15/972,162

(22) Filed: May 6, 2018

(65) Prior Publication Data

US 2019/0342538 A1 Nov. 7, 2019

(51) Int. Cl.
*H04N 13/207* (2018.01)
*G06T 7/41* (2017.01)
*H04N 13/254* (2018.01)

(52) U.S. Cl.
CPC ............. *H04N 13/207* (2018.05); *G06T 7/41* (2017.01); *H04N 13/254* (2018.05)

(58) Field of Classification Search
None
See application file for complete search history.

(56) References Cited

U.S. PATENT DOCUMENTS

| | | | |
|---|---|---|---|
| 7,905,031 B1* | 3/2011 | Paulino | G01B 21/04 33/503 |
| 2004/0176928 A1* | 9/2004 | Johnson | G01B 11/24 702/182 |
| 2005/0219511 A1* | 10/2005 | Jung | G01J 3/02 356/73 |
| 2011/0304705 A1* | 12/2011 | Kantor | A61B 5/0059 348/49 |

\* cited by examiner

*Primary Examiner* — Matthew C Bella
*Assistant Examiner* — Brian D Shin

(57) ABSTRACT

The invention is one optical measurement based three-dimension (3D) topology detection equipment. It is conducted to improve the reconstruction accuracy and achieve the objective of acquiring both macro and micro texture morphology. The invention provides a method to acquire both macro and micro texture morphology of pavement at the same time, which can be used to measure characteristics of a surface topology. The proposed method requires six light sources and is improved by adopting low-rank decomposition method, control point-based interpolation surface algorithm to solve normal vector, which can reduce the measurement error and improve the test accuracy. Six highlighting concentrated parallel light sources (HSL-58-105-W) are required in the method. The slant angles of six light sources are all 45° and the tilt angle of six light sources is 0°, 60°, 120°, 180°, 240°, 300°, respectively. The camera is SONY DSC HX-300 digital single lens reflex (SLR) and six photos of pavement texture morphology are taken by the camera under different illumination. Compared with traditional texture morphology test method, the acquisition (Continued)

The comparison of different testing methods method in the invention can obviously increase the test precision of texture morphology and acquire macro and micro texture morphology at the same time fast, accurately and repeatedly.

9 Claims, 5 Drawing Sheets

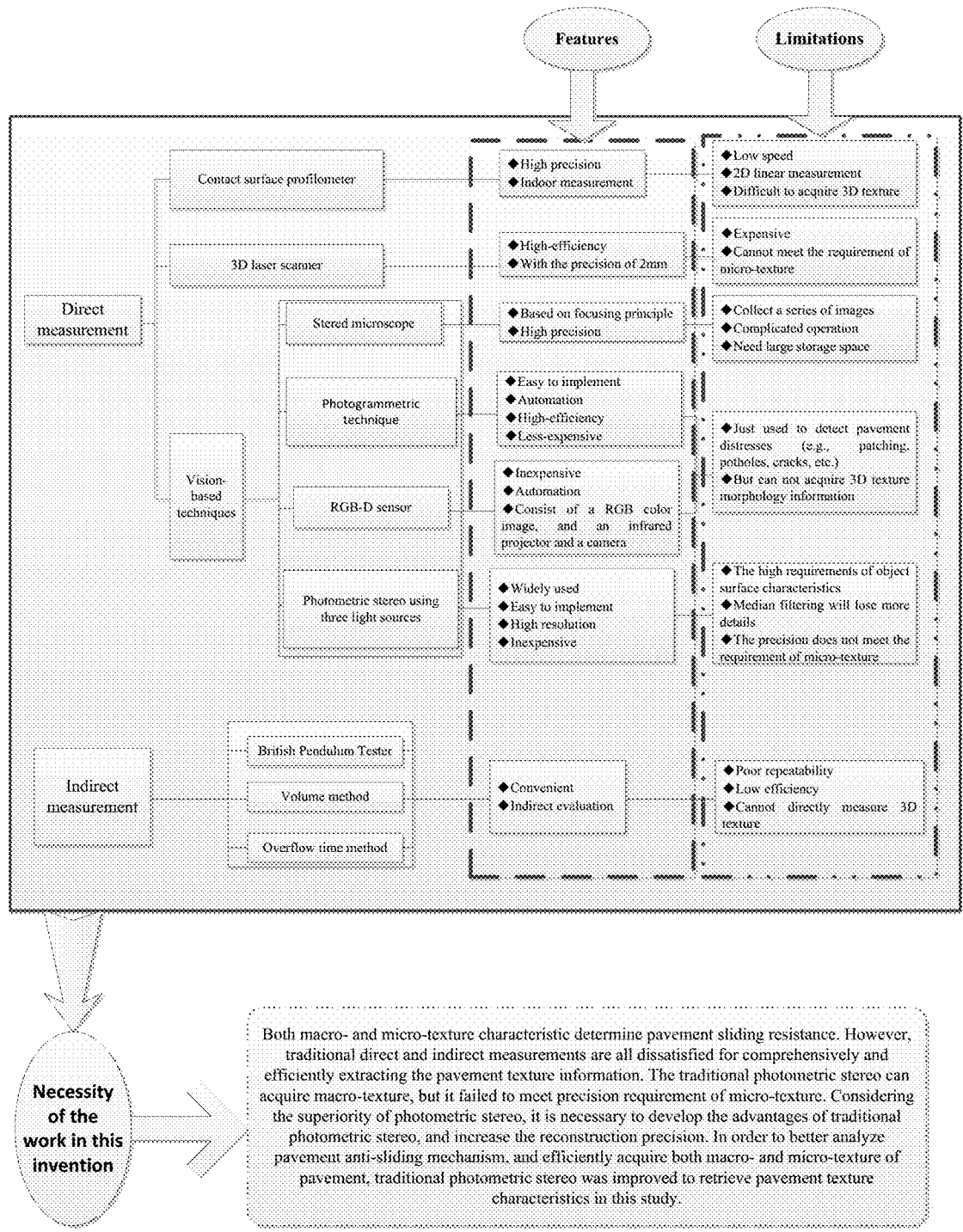
FIGURE 1. The comparison of different testing methods

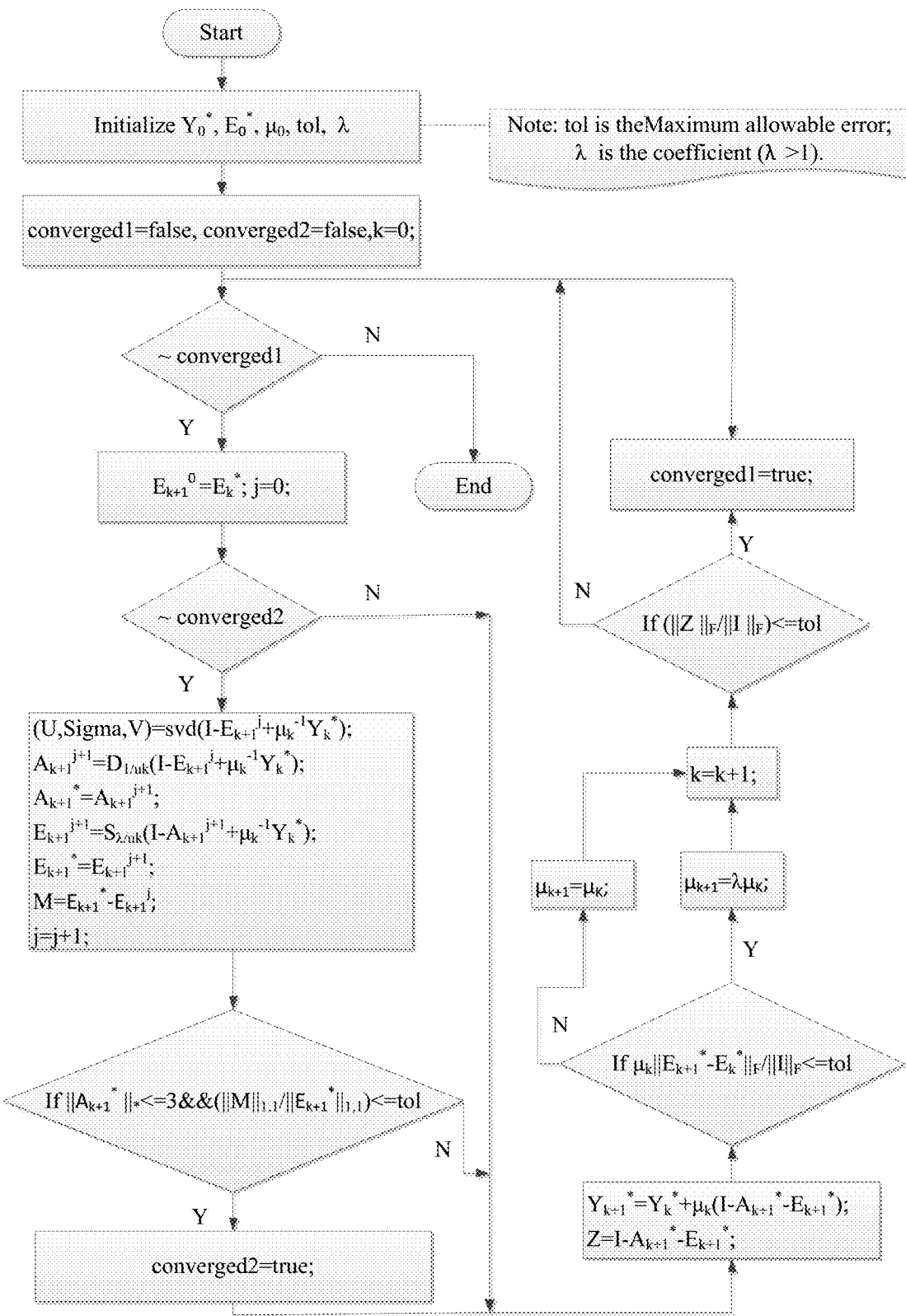
FIGURE 2. The flow chart of ALM algorithm

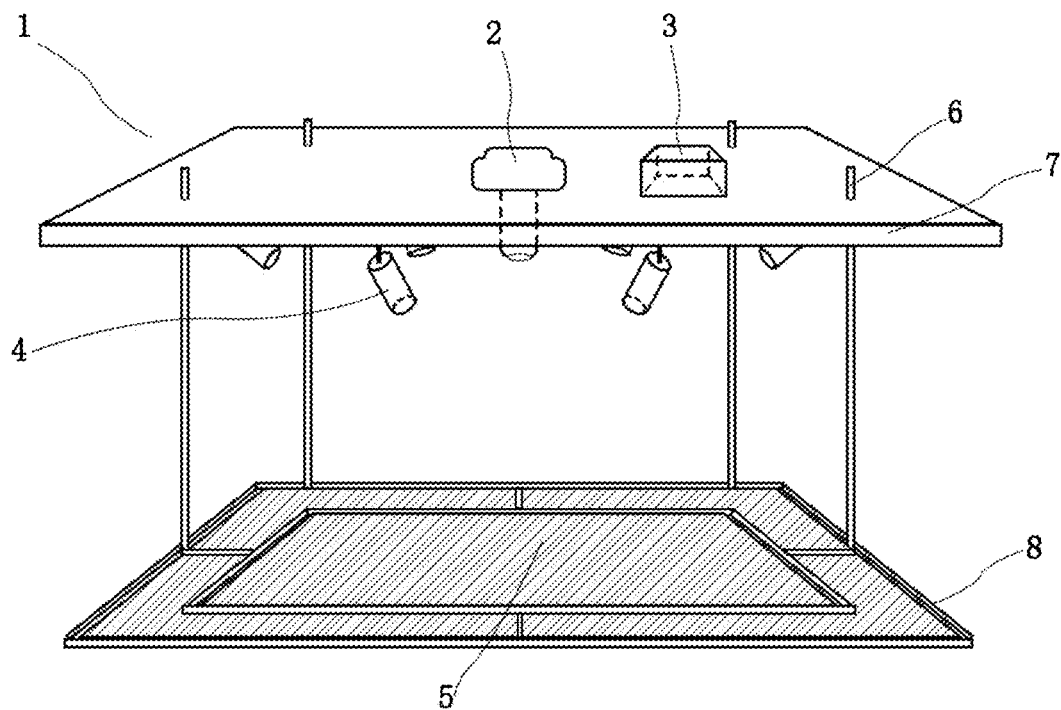
FIGURE 3A. 3D topology detection apparatus, 3D view
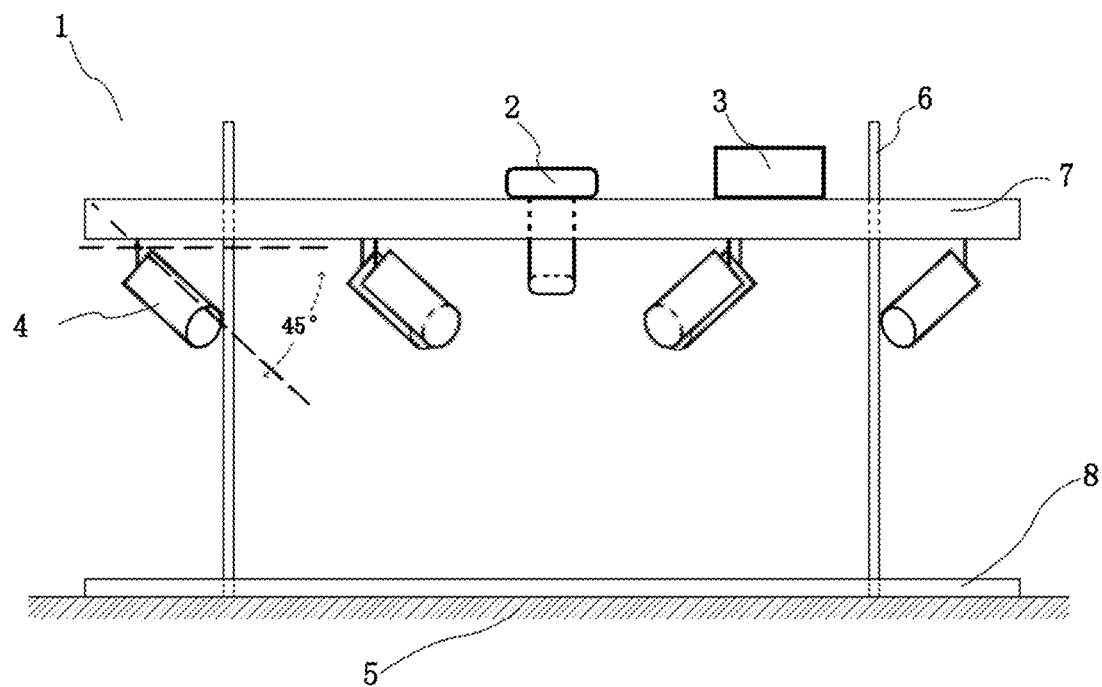
FIGURE 3B. 3D topology detection apparatus, front view

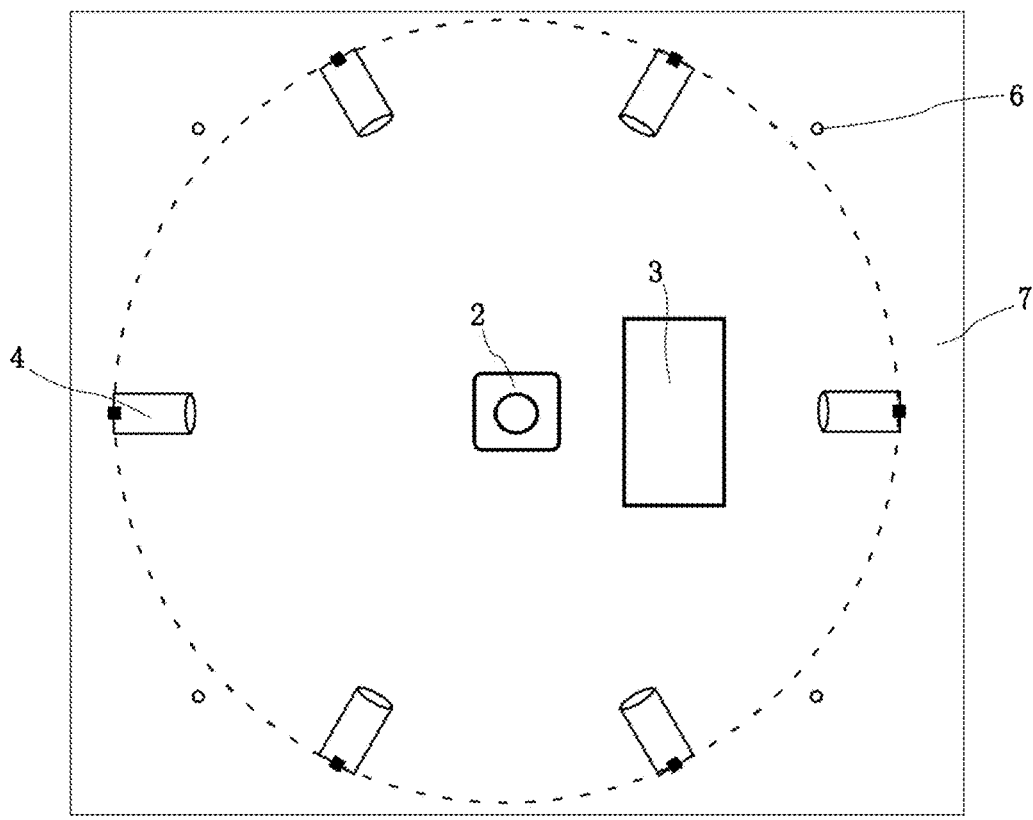
FIGURE 3C. 3D topology detection apparatus, top view
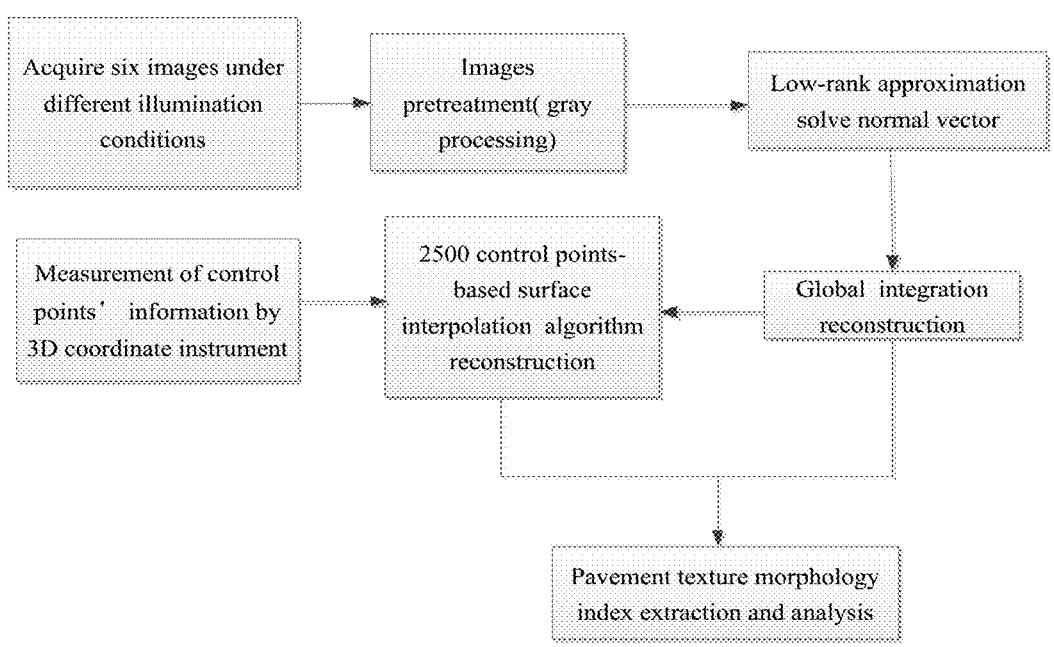
FIGURE 4. The flow chart of the invention

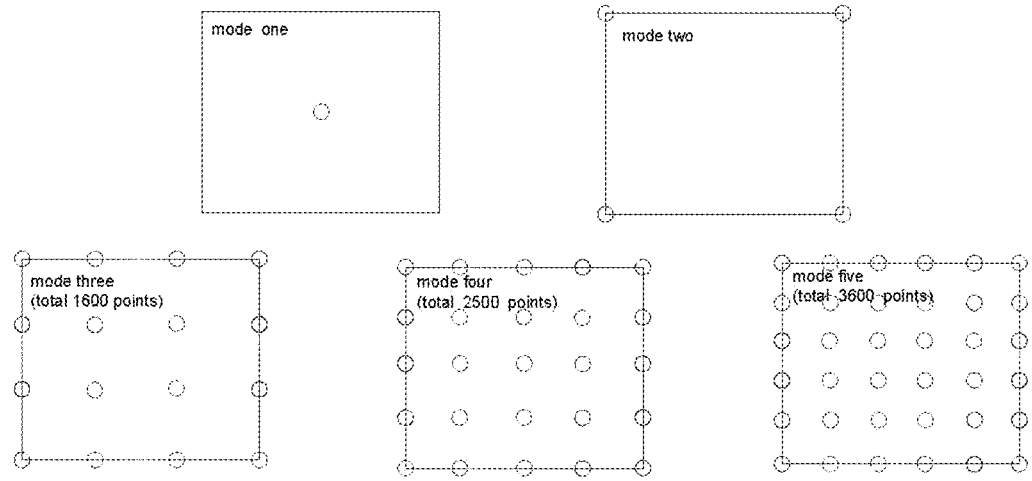
FIGURE 5. Distribution patterns of different control points
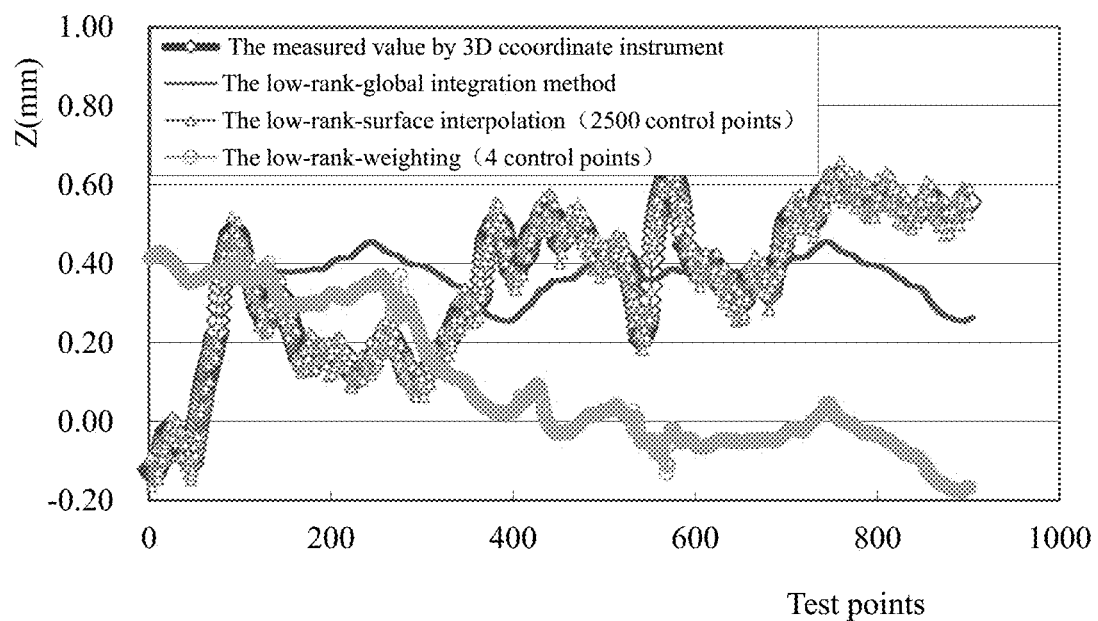
FIGURE 6. Test results measured by different improved algorithms

METHOD AND APPARATUS FOR MEASURING CHARACTERISTICS OF A SURFACE TOPOLOGY

CROSS-REFERENCE TO RELATED APPLICATIONS

Horovitz and Kiryati (2004) reconstructed a nonsmooth surface by photometric stereo method using three light sources. Significant variances were found in a discontinuous area. Slimane et al. (2008) and El Gendy et al. (2011) used three light source photometric stereo to measure the texture morphology of road surface. The results indicated that three light source photometric stereo could acquire the macro texture. But this method could not meet the accuracy requirement for the measurement of micro texture morphology. The existing photometric stereo method using three light sources with median filtering is effective for recovering a smooth and continuous Lambert model surface, but does not perform well when reconstructing pavement surface because of the twofold uniqueness of pavement surface as compared to other object surfaces First, pavement surface is not an ideal Lambert model because asphalt oil film and mineral powder on pavement surface can cause mirror reflection, which may lead to the formation of highlighted points and noise points under light condition. Second, coarse asphalt pavement will generate some blind angles, which may form a shaded area.

FIELD OF THE INVENTION

The present invention relates to an apparatus for detecting 3D texture morphology topology on structure surface. More specifically, the present invention belongs to civil, and transportation, which relates to 3D topology detection systems that may be used to acquire both macro and micro texture morphology of pavement at the same time, measure characteristics of a surface topology.

BACKGROUND OF THE INVENTION

The superior anti-sliding performance of pavement can provide a good adhesion for high speed vehicles and reduce traffic accidents, which is an important guarantee of road safety. For the frequent occurrence of traffic accidents, the insufficient anti-sliding ability of road surface is one main reason. However, the sliding resistances of pavement are closely related with the characteristics of texture morphology. The 18th session of the World Conference on road surface characteristics found that pavement friction mainly depended on the macro texture morphology and the micro texture morphology of road surface. The macro texture morphology with depths from 0.2 mm to 10 mm and widths from 0.5 mm to 50 mm is mainly determined by the size, shape, arrangement and other factors of aggregates. The micro texture morphology with depths less than 0.2 mm and widths less than 0.5 mm was mainly formed by asphalt mastic and the microscopic structure of aggregate surface, which is the main reason for the formation of the friction during the process of vehicles running at low speed.

The test methods of anti-sliding for asphalt pavement usually include fixed site measurement and continuous measurement. The fixed site equipments (such as: CTMeter (Circular Track Texture Meter), British Pendulum Tester, Dynamic Friction Tester, etc) need to temporarily interrupt the traffic and affect the normal traffic flow. And the severe shortcoming of continuous measurement equipments is their expensive price. However, just from the perspective of texture measurement, whether the fixed site equipments or the continuous equipments are used, it is difficult to comprehensively measure both the macro and micro texture morphology and give the composition of two kinds of texture morphology.

The test methods of texture morphology information of asphalt pavement are divided into direct measurement and indirect measurement according to the test mode, FIG. 1. Direct measurement methods contain contact surface profilometer, three-dimensional laser scanner and stered microscope, etc. But the speed of contact surface profilometer is slow and this method is only applicable to indoor measurement for limited points' detection. In addition, this method is usually used in two-dimensional linear measurement, which is difficult to achieve high precision of three-dimensional topography measurement. Three-dimensional laser scanner is not only expensive, but the measurement precision is controlled within 2 mm, which cannot meet the requirement of measurement precision for the microscopic texture topography. Based on the principle of focusing, Mahboob Kanafi, et al. evaluated the reconstruction effect of pavement three-dimensional texture topography by stered microscope and obtained a satisfactory result. However, this method needs to collect a series of images and identify the clear area by constantly moving these images, which requires large storage space. In regard of indirect measurement (such as: British Pendulum Tester, volume method and the overflow time method), although their operation is simple, they can't intuitively describe the road surface morphology due to their poor test repeatability and low test efficiency, which limit their further development on texture measurement.

The inevitable questions always existing in asphalt pavement are as follows: (1) Road surface is not an ideal Lambert model because the asphalt oil film and the mineral powder on the surface of road will cause mirror reflection leading to the formation of highlight points and noise points under the light conditions. (2) The coarse asphalt pavement will generate some blind angles forming shaded area. The traditional photometric stereo has better recovery effect for smooth and continuous Lambert model surface. But it is difficult to obtain a satisfactory reconstruction precision for the special surface like asphalt pavement. Sun et al. analyzed the factors affecting the reconstruction results of traditional three light source photometric stereo and studied the uncertainty of normal vector error. Results showed that increasing light intensity and keeping light incident direction orthogonal is helpful to reduce the uncertainty of error. The non-smooth surface was reconstructed by Horovitz et al. with the help of traditional three light source photometric stereo. The results showed that the significant variances were found in the discontinuous area. Slimane et al. and El Gendy et al. used three light source photometric stereo to measure the texture morphology of road surface. The results indicated that three light source photometric stereo could acquire the macro texture. But this method could not meet the accuracy requirement for the measurement of micro texture morphology. Liu et al. tried to use color information from true color images to restore the texture morphology of road surface. But the results still did not meet the precision requirement of micro texture morphology due to the existence of local error. Therefore, although the traditional photometric stereo has higher resolution, it is difficult to satisfy the precision requirement of the microscopic texture due to the special features of the asphalt pavement, which limits its application in the measurement of pavement texture morphology.

Three-dimensional reconstruction technique based on photometric stereo is widely used in reverse engineering, production quality control, industrial inspection and medical diagnosis because of the advantage of simplicity and high resolution. Therefore, Three-dimensional reconstruction of texture for pavement based on photometric stereo is improved in the invention. The acquisition method in the invention can obviously increase the test precision of texture morphology and acquire macro and micro texture morphology at the same time fast, accurately and repeatedly, which is essential to choose the materials for asphalt pavement, daily maintenance and pavement design.

SUMMARY OF THE INVENTION

Generally, the present invention is an apparatus and method for measuring macro texture morphology. The purpose of the invention is to provide a method to test macro and micro texture morphology at the same time fast and accurately, which can be used to analyze and evaluate the skid resistance of pavement.

Three-dimensional reconstruction of texture for pavement based on photometric stereo is improved in the invention. The main feature is using six light sources. The slant angles of six light sources are all 45° and the tilt angle of six light sources is 0°, 60°, 120°, 180°, 240°, and 300°, respectively. Six photos under different illumination are taken by the camera. The texture morphology information is solved by computer programming like low-rank decomposition method and control point-based interpolation surface algorithm.

The modified low rank decomposition algorithm used in the invention can decompose the composite matrix of light sources into two parts, including composite matrix of light sources with low rank and noise matrix. In order to reduce the side effects on the solution accuracy caused by the fact of noise, surface normal vector field is solved by the composite matrix of light sources. The low-rank decomposition problem of matrix can be converted to an optimization problem as follow.

$$\min_{A,E} \|E\|_F \quad \text{s.t.} \quad \text{rank}(A) \leq r, I = A + E \tag{1}$$

Where $\|E\|_F$ is the Frobenius norm of matrix, E, and $$\|E\|_F = \sqrt{\sum_{i=1}^{m}\sum_{j=1}^{n} a_{ij}^2}.$$

Augmented Lagrange function needs to be established before using the ALM method:

$$L(A, E, Y, \mu) = \|A\|_* + \lambda\|E\|_{1,1} + \langle Y, I - A - E \rangle + \frac{\mu}{2}\|I - A - E\|_F^2 \tag{2}$$

Where $Y \in R^{m \times n}$ is the linear constraints multiplier; $\mu > 0$ is the penalty parameter; $\langle,\rangle$ is standard inner product. When $Y=Yk$ and $\mu=\mu k$, using alternating update method to solve the optimization problem $$\min_{A,E} L(A, E, Y_k, u_k).$$

A is first solved to minimize L with Y and E being fixed. Then Y and A are fixed to search one E making L minimized. The optimal solution of the sub problem can be solved by continuous iteration.

If $E = E_{k+1}^j$, so $$A_{k+1}^{j+1} = \arg\min_A L(A, E_{k+1}^j, Y_k, \mu_k) \tag{3}$$

$$= \arg\min_A \|A\|_* + \frac{\mu_k}{2}\|A - (I - E_{k+1}^j + \mu_k^{-1}Y_k)\|_F^2$$

$$= D_{1/\mu_k}(I - E_{k+1}^j + \mu_k^{-1}Y_k)$$

Then the matrix E was determined by the continuous iteration of $A_{k+1}^{j+1}$.

$$E_{k+1}^{j+1} = \arg\min_A L(A_{k+1}^{j+1}, E, Y_k, \mu_k) \tag{4}$$

$$= \arg\min_A \lambda\|E\|_{1,1} + \frac{\mu_k}{2}\|E - (I - A_{k+1}^{j+1} + \mu_k^{-1}Y_k)\|_F^2$$

$$= S_{\lambda/\mu_k}(I - A_{k+1}^{j+1} + \mu_k^{-1}Y_k)$$

Alternately update until the convergence of sub problem. The steps of solving this problem are shown in FIG. 2.

The control point-based interpolation surface algorithm in the invention firstly used the information of control points to calculate the interpolation surface function, $f_1(x,y)$. Then the surface texture morphology, $z(x,y)$, was solved by adding $f_1(x,y)$ to the texture morphology function, $f(x,y)$, namely $z(x,y)=f(x,y)+f_1(x,y)$. In order to improve reconstruction error, this improved algorithm forced the final reconstruction texture morphology to close to the given control points.

$$f_1(x, y) = \sum_{m=1}^{N} \mu_m g_m(x, y) + c_0 + c_1 x + c_2 y \tag{5}$$

Where $\mu_m$ is the weighting factor of the $m^{th}$ control point; $g_m(x,y)$ is spline function; $c_0$, $c_1$, $c_2$ are all undetermined coefficients. The $g_m(x,y)$ is a function of the distance from the point $(x,y)$ to the $m^{th}$ control point, $(a_m,b_m,l_m)$, Equation (6).

$$g_m(x, y) = \begin{cases} r_m^2 \log r_m & r_m > 0 \\ 0 & r_m = 0 \end{cases} \tag{6}$$

Where $r_m$ is the distance and $r_m \sqrt{(x-a_m)^2+(y-b_m)^2}$.

Assuming that the depth solved by variational method at point $(a_m,b_m)$ is $h_m$ and the height difference $v_m=l_m-h_m$. Then the coefficients of interpolation surface function, $\mu_m$, $c_0$, $c_1$, $c_2$, were calculated by Equation (7).

$$(\mu_1, \mu_2, \ldots, \mu_N, c_0, c_1, c_2)^T = L^{-1}Y \tag{7}$$

Where $Y = (v_1, v_2, \ldots, v_N, 0, 0, 0)^T$;

$$L = \begin{bmatrix} K & P \\ P & O \end{bmatrix}_{(N+3) \times (N+3)};$$

O is 3×3 null matrix. The K and P from operator Y were respectively calculated by Equation (8) and Equation (9).

$$K = \begin{bmatrix} 0 & T(t_{12}) & \cdots & T(t_{1N}) \\ T(t_{21}) & 0 & \cdots & T(t_{2N}) \\ \cdots & \cdots & \cdots & \cdots \\ T(t_{N1}) & T(t_{N2}) & \cdots & 0 \end{bmatrix}_{N \times N} \quad (8)$$

Where $$T(t) = \begin{cases} t^2 \log t & t > 0 \\ 0 & t = 0 \end{cases}; t_{mn} = \sqrt{(a_m - a_n)^2 + (b_m - b_n)^2}, 1 \le m, n \le N.$$

$$P = \begin{bmatrix} 1 & 1 & \cdots & 1 \\ a_1 & a_2 & \cdots & a_N \\ b_1 & b_2 & \cdots & b_N \end{bmatrix}_{3 \times N} \quad (9)$$

The pavement texture morphology based on the control point-based interpolation surface improved algorithm was finally acquired.

A three-dimension (3D) topology detection apparatus comprising: one camera, six light sources, one power controller and an equipment bracket, FIG. 3.

The camera used in the invention is SONY DSC HX-300 digital single lens reflex (SLR) whose maximum pixel is 5184×3888 (2000 w pixels). The camera is set into RAW format (one lossless image format) and the RGB color space model for saving the images information completely.

The light source used in the invention is homemade HSL-58-105-W type highlighting concentrated parallel light source. The rated operational voltage of light source is 5V and the rated power is 3.4 W. The principle of focusing lens is used by the HSL-58-105-W type light source to achieve long-range high strength light illumination.

In order to stabilize the light conditions and reduce experiment error caused by lighting, UST-AP2U2CHT type power controller was selected to control light irradiation intensity. The input voltage and the output voltage of power controller are 220V and 5V, respectively. The maximum adjustable current is 750 mA.

Croma8106 type three-dimensional coordinate instrument as one kind of contact surface profilometer was used to determine the actual texture morphology of the specimens.

The procedure of the method is as follows, FIG. 4:
1) Take six photos under different illumination;
2) Gray the photos;
3) Composite intensity matrix of six photos is processed by modified low-rank decomposition method to solve normal vector.
4) Three-dimensional texture morphology of the test area of pavement is solved by global integral reconstruction algorithms on the basis of step 3;
5) Coordinate information of control points is tested by three-dimensional coordinate instrument;
6) On the basis of step 4 and 5, solution accuracy of three-dimensional texture morphology is improved by adopting control point-based interpolation surface algorithm.

The interference of the noise can be effectively reduced and the side effect caused by highlight and shadow area can be excluded by adopting modified low rank decomposition algorithm, which make the whole reconstructed surface have better visual effect.

The control point-based interpolation surface algorithm combined the global integration and the elevation information of relative position compared with control point-based weighting method, which further optimized the reconstruction accuracy and made the eventual reconstruction precision improve with the increase of the control points.

The acquisition method in the invention can obviously increase the test precision of texture morphology and acquire macro and micro texture morphology at the same time fast, accurately and repeatedly.

The invention has low cost and it is easy to perform.

Five different distribution patterns of control points were selected to analyze the effect of the number of control points on reconstruction precision, FIG. 5. The mode one only contains one control point that located in the center of the image acquisition area. The mode two has four control points that distribute in four vertices of boundary. The mode three is the combination of mode one and mode two, which include five control points. The mode four has nine control points with joining midpoint of boundary on the basis of mode two. And the mode five exists twelve control points that evenly distribute in the border and the center position.

The effect of different number of control points on the reconstruction precision was analyzed, FIG. 6. The reconstruction precision based on 2500 control points is proved to be satisfactory because 2500 control points can meet the precision requirement of macro and micro texture morphology for pavement.

The analysis results of statistical indicators of both macro- and micro-texture morphology indicate that though the low-rank-global integration algorithm does not like low-rank-surface interpolation algorithm showing an outstanding performance, the test accuracy of low-rank-global integration algorithm is greatly improved for both macro- and micro-texture morphology compared with the traditional three light sources photometric stereo algorithm. But compared with traditional three light sources photometric stereo, the low-rank-global integration algorithm can obtain a satisfactory reconstruction results for both macro- and micro-texture morphology.

Just from the perspective of solving the proposed algorithm, in a common personal computer with Intel(R)i5-3470 CPU and 4 GB memory, each running the program just needs 7 seconds.

The main contributions of the algorithm are given as follows: first, six light sources instead of three light sources are adopted to enhance the illumination and eliminate incomplete information retrieval; second, the median filtering method is removed because it loses more details of images and cannot process the problems caused by highlights and shadow; third, based on the low-rank characteristics of imaging system, the proposed algorithm combines the six light sources method with the low-rank approximation to process the problems caused by noise, highlights and shadow; finally, control point-based surface interpolation algorithm is used as a complement to improve the local details of 3D reconstruction.

FIG. 1 is a depiction of the present testing methods used to detect the texture morphology topology on structure surface;

FIG. 2 is a flow chart of ALM algorithm;

FIGS. 3A, 3B and 3C are there views of instrument setup model schematics of 3D topology detection apparatus;

FIG. 4 is a flow chart of the invention;

FIG. 5 is the distribution patterns of different control points;

FIG. 6 is the results measured by different improved algorithms.

DETAILED DESCRIPTION, DESCRIPTION OF DRAWINGS

FIG. 1 list the comparison of different present testing methods. The vision-based techniques have the key advantage of achieving the automation, reducing the test time and improving the efficiency. The development of these techniques has furthered the application of advanced automated methods to detect and assess pavement conditions. The photometric stereo method, as one major component of vision-based techniques has been widely used in reverse engineering, product quality control and industrial testing due to its simple operation and high resolution. It does not need to deliberately look for feature point and solve the problem of feature matching. However, the traditional photometric stereo with three light sources requires that the object surface meet the smooth and continuous characteristics. Furthermore, the median filtering process in traditional photometric stereo will lose more details of images and reduce the reconstruction precision. Though the three light sources-based photometric stereo is able to acquire macro-texture, fail to meet precision requirement of micro-texture. Therefore, it is necessary to develop the advantages of traditional photometric stereo, improve its insufficiency, and increase the reconstruction precision.

FIG. 2 show the steps of ALM (Augmented Lagrange Multiplier) algorithm. ALM algorithm is faster and more accurate with less storage memory requirement than other algorithms. When $Y=Y_k$ and $\mu=\mu_k$, using alternating update method to solve the optimization problem $$\min_{A,E} L(A, E, Y_k, \mu_k).$$

A is first solved to minimize L with Y and E being fixed. Then Y and A are fixed to search one E making L minimized. The optimal solution of the sub-problem can be solved by continuous iteration.

FIGS. 3A, 3B and 3C are the instrument setup model schematics of 3D topology detection apparatus, which comprising: one camera, six light sources, one power controller and an equipment bracket. Following is the description for each part.
1) Overall model of the 3D topology detection apparatus;
2) SONY DSC HX-300 Camera;
3) Light power controller;
4) One of six light sources;
5) Road surface to be detected;
6) One of four table legs;
7) Table top;
8) Table base FIG. 4 is a flow chart of the invention. Six light sources instead of three light sources are adopted to enhance the illumination and eliminate incomplete information retrieval. Besides, the median filtering method is removed because it loses more details of images and cannot process the problems caused by highlights and shadow. Based on the low-rank characteristics of imaging system, the proposed algorithm further combines the six light sources method with the low-rank approximation to process the problems caused by noise, highlights and shadow.

FIG. 5 is the distribution patterns of different control points. Five different distribution patterns of control points are selected to analyze the effect of the number of control points on reconstruction precision. The mode one only contains 1 control point that located in the center of the image acquisition area. The mode two has 4 control points that distribute in four vertices of boundary. The mode three, mode four and mode five are include 1600 control points, 2500 control points and 3600 control points, respectively. And all these control points evenly distribute in the border and the center position.

FIG. 6 is the results measured by different improved algorithms. Regarding the measured value by 3D coordinate instrument as evaluation standard, the results show relatively small deviations for the low-rank approximation-based global integration method (the low-rank-global integration method) and the control point-based surface interpolation algorithm (the low-rank-surface interpolation). But due to the introduction of deviation from local integration, the reconstruction effect of control point-based weighting algorithm (the low-rank-weighting) is poor.

The invention claimed is:

1. A three-dimension (3D) topology detection apparatus comprising: a processor, one camera, six light sources, one power controller and an equipment bracket;
    wherein slant angles of the six light sources are all 45°, and tilt angles of the six light sources are 0°, 60°, 120°, 180°, 240°, and 300°, respectively;
    the power controller is configured to control light irradiation intensities of the six light sources; and
    the processor is configured to execute the following instructions:
        capturing six photos by the camera under different illuminations, wherein the different illuminations refer to the six light sources separately illuminating a test area of a road surface;
        performing gray processing on the six photos, and composing the six photos after the gray processing to obtain a composite intensity matrix of the six photos after the gray processing;
        decomposing the composite intensity matrix of the six photos after the gray processing into a composite matrix with low rank and a noise matrix by using a modified low-rank decomposition algorithm, and calculating a normal vector of the test area of the road surface based on the composite matrix with low rank;
        calculating, based on the normal vector of the test area of the road surface, a texture morphology function of the test area of the road surface by using a global variational algorithm;
        obtaining coordinate information of control points by a three-dimension coordinate instrument, wherein the control points are evenly distributed in borders and a center of an area where to capture the six photos; and
        obtaining, based on the coordinate information of the control points and the texture morphology function of the test area of the road surface, an interpolation surface function by using a control point-based interpolation surface algorithm, and summing the texture morphology function of the test area of the road surface and the interpolation surface function to obtain a modified texture morphology function of the test area of the road surface.

2. The 3D topology detection apparatus of claim 1, wherein the camera is a SONY DSC HX-300 digital single lens reflex (SLR) whose maximum pixel is 5184×3888; the camera is set into a RAW format and a RGB color space model for saving image information.

3. The 3D topology detection apparatus of claim 1, wherein each of the six light sources is a homemade HSL-58-105-W type highlighting concentrated parallel light source; a rated operational voltage of each of the six light sources is 5V and a rated power of each of the six light sources is 3.4 W; the HSL-58-105-W type light source is configured to provide long-range high strength light illumination by using a principle of focusing lens.

4. The 3D topology detection apparatus of claim 1, wherein the power controller is a UST-AP2U2CHT type power controller; an input voltage of the UST-AP2U2CHT type power controller is 220V, an output voltage of the UST-AP2U2CHT type power controller is 5V, and a maximum adjustable current of the UST-AP2U2CHT type power controller is 750 mA.

5. The 3D topology detection apparatus of claim 1, wherein the three-dimension coordinate instrument is a Croma8106 type three-dimensional coordinate instrument, the Croma8106 type three-dimensional coordinate instrument as one kind of contact surface profilometer is used to determine an actual texture morphology of the test area of the road surface.

6. The 3D topology detection apparatus of claim 1, wherein the camera is fixed right above the test area of the road surface to acquire the six photos under the different illuminations, and the test area of the road surface is illuminated by the six light sources from different incident directions, respectively.

7. The 3D topology detection apparatus of claim 1, wherein the control point-based surface interpolation algorithm is used as a complement to improve the local details of 3D reconstruction.

8. The 3D topology detection apparatus of claim 1, wherein the modified low-rank decomposition algorithm is configured to convert the composite intensity matrix of the six photos after the gray processing to an optimization problem:

$$\min_{A,E}\|E\|_F \text{ s.t. } rank(A) \le r, I = A + E;$$

wherein $\|E\|_F$ is a Frobenius norm of a matrix E, $$\|E\|_F = \sqrt{\sum_{i=1}^{m}\sum_{j=1}^{n} a_{ij}^2};$$

rank (A) is a rank of a matrix A;
establishing an Augmented Lagrange function as follows:

$$L(A, E, Y, \mu) = \|A\|_* + \lambda\|E\|_{1,1} + \langle Y, I - A - E\rangle + \frac{\mu}{2}\|I - A - E\|_F^2$$

wherein $Y \in R^{m \times n}$ is the linear constraints multiplier; $\mu > 0$ is the penalty parameter; $\langle , \rangle$ is standard inner product; when $Y=Y_k$ and $\mu=\mu_k$, using alternating update method to solve the optimization problem $$\min_{A,E} L(A, E, Y_k, u_k);$$

fixing Y and A to search E making L minimized, such that an optimal solution of the sub problem is solved by continuous iteration;

If $E = E_{k+1}^j$, then:

$$A_{k+1}^{j+1} = \underset{A}{\operatorname{argmin}} L(A, E_{k+1}^j, Y_k, \mu_k)$$
$$= \underset{A}{\operatorname{argmin}} \|A\|_* + \frac{\mu_k}{2}\|A - (I - E_{k+1}^j + \mu_k^{-1}Y_k)\|_F^2$$
$$= D_{1/\mu_k}(I - E_{k+1}^j + \mu_k^{-1}Y_k)$$

determining the matrix E by the continuous iteration of $A_{k+1}^{j+1}$;

$$E_{k+1}^{j+1} = \underset{A}{\operatorname{argmin}} L(A_{k+1}^{j+1}, E, Y_k, \mu_k)$$
$$= \underset{A}{\operatorname{argmin}} \lambda\|E\|_{1,1} + \frac{\mu_k}{2}\|E - (I - A_{k+1}^{j+1} + \mu_k^{-1}Y_k)\|_F^2$$
$$= S_{\lambda/\mu_k}(I - A_{k+1}^{j+1} + \mu_k^{-1}Y_k).$$

9. The 3D topology detection apparatus of claim 1, wherein the texture morphology function of the test area of the road surface $f_1(x,y)$ is calculated by:

$$f_1(x, y) = \sum_{m=1}^{N} \mu_m g_m(x, y) + c_0 + c_1 x + c_2 y$$

wherein (x,y) is a point, $\mu_m$ is a weighting factor of a mth control point $(a_m, b_m, l_m)$; c0, c1, c2 are coefficients; $g_m(x,y)$ is a spline function configured to calculate a distance from the point (x,y) to the mth control point $(a_m, b_m, l_m)$:

$$g_m(x, y) = \begin{cases} r_m^2 \log r_m & r_m > 0 \\ 0 & r_m = 0 \end{cases};$$

wherein $r_m$ is a distance and calculated by: $r_m = \sqrt{(x-a_m)^2+(y-b_m)^2}$;
assuming that a depth obtained by the global variational method at the point $(a_m, b_m)$ is $h_m$ and a height difference $v_m=l_m-h_m$;
the coefficients μm, c0, c1, c2 are calculated by:

$$(\mu_1,\mu_2,\ldots,\mu_N,c_0,c_1,c_2)^T = L^{-1}Y;$$

wherein $Y=(v_1, v_2 \ldots, v_N, 0, 0, 0)^T$;

$$L = \begin{bmatrix} K & P \\ P & O \end{bmatrix}_{(N+3)\times(N+3)};$$

O is 3×3 null matrix;
K and P from operator Y are respectively calculated by:

$$K = \begin{bmatrix} 0 & T(t_{12}) & \ldots & T(t_{1N}) \\ T(t_{21}) & 0 & \ldots & T(t_{2N}) \\ \ldots & \ldots & \ldots & \ldots \\ T(t_{N1}) & T(t_{N2}) & \ldots & 0 \end{bmatrix}_{N \times N};$$

wherein $$T(t) = \begin{cases} t^2 \log t & t > 0 \\ 0 & t = 0 \end{cases};$$

$$t_{mn} = \sqrt{(a_m - a_n)^2 + (b_m - b_n)^2}, 1 \leq m, n \leq N;$$

$$P = \begin{bmatrix} 1 & 1 & \ldots & 1 \\ a_1 & a_2 & \ldots & a_N \\ b_1 & b_2 & \ldots & b_N \end{bmatrix}_{3 \times N}.$$

\* \* \* \* \*